Aug. 8, 1967  E. A. DANISCH  3,334,475
INSECT AND LIQUID FERTILIZER SPRAY ATTACHMENT
FOR ROTARY LAWN MOWERS
Filed May 19, 1965
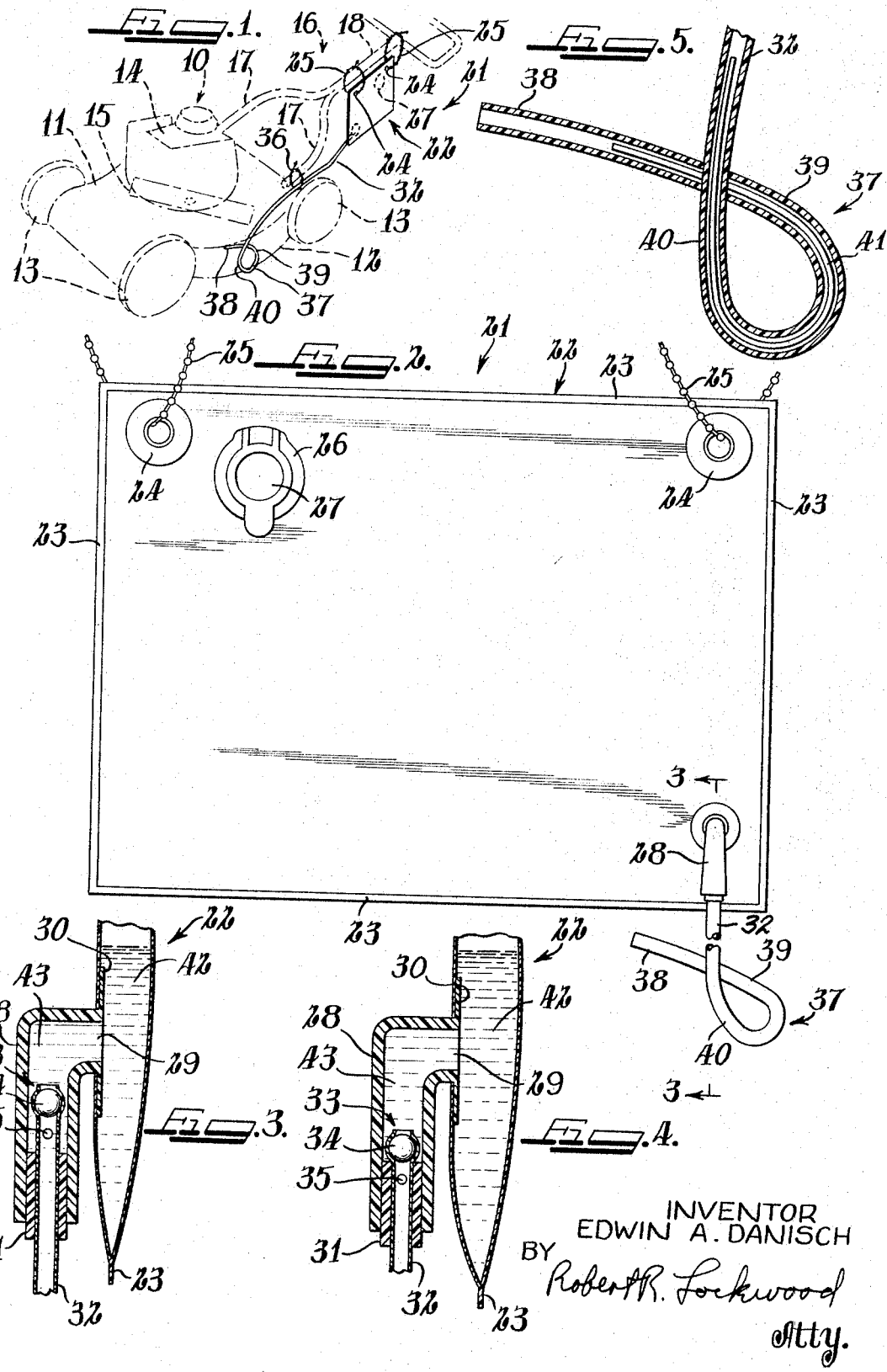
INVENTOR
EDWIN A. DANISCH
BY Robert R. Lockwood
Atty.

United States Patent Office 3,334,475
Patented Aug. 8, 1967

3,334,475
INSECT AND LIQUID FERTILIZER SPRAY ATTACHMENT FOR ROTARY LAWN MOWERS
Edwin A. Danisch, 1810 W. Atkinson Road,
Palatine, Ill. 60067
Filed May 19, 1965, Ser. No. 457,021
6 Claims. (Cl. 56—25.4)

This invention relates, generally, to devices for spraying liquid containing an insect killer or a weed killer or a fertilizer or various combinations thereof over a lawn simultaneously with the operation of a lawn mower, preferably of the rotary type.

Among the objects of this invention are: To provide in a new and improved manner for spraying liquid containing one or more ingredients for treating a lawn while mowing it; to provide a reservoir in the form of a flexible plastic bag adapted to be detachably secured to the guiding handle of the lawn mower and to be connected by a flexible plastic tube to discharge the liquid within the housing over the rotary blade of the mower for distribution thereby; to provide a new and improved valve between the tube and the reservoir at a point of attachment of the former to the latter; and to provide for resiliently holding the tube to opposite sides of a side wall of the housing of the mower in order to position the discharge end of the tube above the blade of the mower and in underlying relation to the top side of the housing.

Other objects of this invention will, in part, be obvious and in part appear hereinafter.

In the drawing:

FIG. 1 is a perspective view showing in broken line outline a conventional lawn mower of the rotary type and by full lines the insect and liquid fertilizer spray attachment embodying this invention.

FIG. 2 is a view, in side elevation and at an enlarged scale, of the spray attachment.

FIG. 3 is a vertical sectional view at an enlarged scale taken generally along the line 3—3 of FIG. 2 and showing the valve in the open position.

FIG. 4 is a view, similar to FIG. 3, and showing the valve in the closed position.

FIG. 5 is a vertical sectional view showing the reverse loop in the flexible tube that is provided with the spring wire loop for holding the discharge end of the tube in a position under the housing of the lawn mower where it can discharge the liquid from the reservoir over the rotating cutting blade.

Referring now particularly to FIG. 1 of the drawing, it will be observed that the reference character 10 designates, generally, a lawn motor of the rotary type that is indicated in broken line outline and may be of any conventional construction. The lawn mower 10 includes a metallic housing 11 having depending side walls one of which is indicated at 12. Wheels 13 are suitably mounted from the housing 11 and an engine 14 is mounted on the top wall. The engine 14 is arranged to rotate a cutting blade 15 about a vertical axis, the cutting blade being located underneath the metallic housing 11. A bifurcated guiding handle 16 is attached by furcations 17 to one end of the housing 11. The guiding handle 16 also includes a central stem portion 18.

Shown by full lines in FIG. 1 is an insect and liquid fertilizer spray attachment embodying the present invention. It is shown, generally, at 21 and includes a reservoir, shown generally at 22, which preferably is in the form of a rectangular bag of suitable plastic material such as polyethylene.

FIG. 2 shows in more detail the construction of the spray attachment 21. Here it will be observed that the rectangular reservoir 22 is heat sealed as indicated at 23 about its four sides. Near the upper edge of the reservoir 22 grommets 24 are provided extending through both walls for receiving plastic ties 25 which are employed for detachably mounting the reservoir 22 on the stem portion 18 of the guiding handle 16. Also near the upper edge a filler opening fitting 26 is provided in one wall of the reservoir 22 and it has a cover 27 for closing it. The grommets 24, plastic ties 25, the filler opening fitting 26 and cover 27 can be formed of suitable rubber-like material.

Near the lower corner of the reservoir 22 nearer to the metallic housing 11 of the lawn mower 10 there is provided an L-shaped outlet stem 28 which also is formed of rubber-like material. The stem 28 opens at 29 through one wall of the reservoir 22 and has a radially extending flange 30 that is suitably secured to the adjacent surface of the wall so as to provide a liquid tight connection. At its lower end the stem 28 is provided with a sleeve 31 of suitable plastic material such as nylon and it has a friction fit. Slidably mounted within the sleeve 31 is one end of a flexible tube 32 of suitable plastic material such as polyethylene. A valve, shown generally at 33, is located on the end of the flexible tube 32 that extends into the lower end of the stem 28. The valve 33 is formed by a metallic ball 34 of such diameter that it completely closes off the upper end of the flexible tube 32 and is held in position therein as shown in FIGS. 3 and 4 of the drawing. A slight distance below the metallic ball 34 a valve opening 35 is formed in the side wall of the flexible tube 32. In the valve open position shown in FIG. 3 the valve opening 35 is located above the upper end of the sleeve 31. In this position the interior of the reservoir 22 is placed in direct communication with the interior of the flexible tube 32. When the valve 33 is to be closed, the flexible tube 32 is moved downwardly through the sleeve 31 to the position shown in FIG. 4 where further movement is prevented by the enlarged upper end of the flexible tube 32 due to the presence of the metallic ball 34. In this position the valve opening 35 is closed by the sleeve 31.

As shown in FIG. 1 the plastic tube 32 extends from the L-shaped stem 28 along one of the furcations 17 to which it is detachably secured by a plastic tie 36. The other end of the flexible tube 32 is looped as indicated at 37 in order to position the discharge end 38 underneath the top wall of the metallic housing 11 and in a position where the flow of liquid from the reservoir 22 can be directed over the rotating cutting blade 15 so as to be distributed thereby. One side 39 of the loop 37 is located inside the depending side wall 12 while the other side 40 of the loop 37 is positioned in overlying relation to the outside of the depending side wall 12. The sides 39 and 40 of the loop 37 are resiliently held against opposite sides of the side wall 12 by a spring wire loop 41 which is shown more clearly in FIG. 5. The flexible tube 31 is threaded over the spring wire loop 41 the diameter of which is such as to provide ample clearance between it and the inner walls of the flexible tube 32.

The reservoir 22 in the form of a plastic bag is filled with liquid as indicated at 42 in FIGS. 3 and 4, the valve 33 being closed as shown in FIG. 4. The liquid fills the interior of the reservoir 22 and also the interior 43 of the outlet stem 28. When it is desired to permit the liquid 42 in the reservoir 22 to discharge from the discharge end 38 of the flexible tube 32, the upper end of the latter is moved upwardly through the sleeve 31 to the position shown in FIG. 3. Then the liquid in the reservoir 42 and in the interior 43 of the stem 28 can flow freely through the valve opening 35 to the flexible tube 32 to be discharged from the discharge end 38. Ordinarily, the valve 33 will be opened after the engine 14 is started. Then the mowing operation can start and the liquid 42 will be distributed by the rotating cutting blade 15 as the mowing operation is performed.

It will be understood that various ingredients can be mixed in the liquid 42, depending upon the use to which it is to be put.

Suitable conventional ingredients can be employed for maintaining a weed and clover free lawn. Other ingredients can be used for fertilizer and still other ingredients can be employed for killing insects.

Instead of employing the spring 41 and bringing the flexible tube 32 underneath the side wall 12, a hole (not shown) can be drilled in the top of the housing 11 and the tube 32 then can be inserted to discharge over the blade 11.

Some types of rotary lawn mowers have the ends of the cutting blade 15 rotatable in too close proximity to the side wall 12 to admit the discharge end 38 of the flexible tube 32. In such case the discharge end 38 can be introduced into the grass discharge chute of the housing 11 either above the path of the blade 15 or in the air stream. When so located the liquid 42 is effectively sprayed over the lawn for its intended purpose.

What is claimed as new is:

1. An insect and liquid fertilizer spray attachment for a lawn mower having a guiding handle and a cutting blade rotatable about a vertical axis underneath a housing having depending side wall comprising: a reservoir adapted to be secured to said handle for containing a supply of liquid, a flexible tube for interconnecting said reservoir and the interior of said housing above said blade to discharge said liquid thereover, and spring means within said tube for clamping said tube in position on opposite sides of a wall of said housing to position the discharge end of said tube above said blade.

2. An insect and liquid fertilizer spray attachment for a lawn mower having a guiding handle and a cutting blade rotatable about a vertical axis underneath a housing having depending side wall comprising: a reservoir adapted to be secured to said handle for containing a supply of liquid, a flexible tube for interconnecting said reservoir and the interior of said housing above said blade to discharge said liquid thereover, and a spring wire loop within said tube having crossed ends for clamping said tube in position on opposite sides of a wall of said housing to position the discharge end of said tube above said blade.

3. An insect and liquid fertilizer spray attachment for a lawn mower having a guiding handle and a cutting blade rotatable about a vertical axis underneath a housing having depending side walls comprising: a reservoir adapted to be secured to said handle for containing a supply of liquid, a flexible tube for interconnecting said reservoir and the interior of said housing above said blade to discharge said liquid thereover, valve means at the junction of said tube with said reservoir to control the flow of said liquid, and spring means within said tube for clamping said tube in position on opposite sides of a wall of said housing to position the discharge end of said tube above said blade.

4. An insect and liquid fertilizer spray attachment for a lawn mower having a guiding handle and a cutting blade rotatable about a vertical axis underneath a housing having depending side walls comprising: a plastic bag adapted to be secured to said handle for containing a supply of liquid, a flexible plastic tube for interconnecting said plastic bag and the interior of said housing above said blade to discharge said liquid thereover, and valve means at the junction of said tube with said plastic bag to control the flow of said fluid; said valve means including a stem opening at one end into said plastic bag, a sleeve inside the other end of said stem through which the intake end of said tube is slidable, and a ball closing said intake end of said tube, there being a valve opening in the wall of said tube spaced from said ball, said opening being closed by said sleeve when said tube is withdrawn therethrough and opened to permit said liquid to flow from said stem into said tube when said tube is moved inwardly through said sleeve a distance sufficient to uncover said aperture.

5. An insect and liquid fertilizer spray attachment for a lawn mower having a guiding handle and a cutting blade rotatable about a vertical axis underneath a housing having depending side walls comprising: a plastic bag adapted to be secured to said handle for containing a supply of liquid, a flexible plastic tube for interconnecting said plastic bag and the interior of said housing above said blade to discharge said liquid thereover, valve means at the junction of said tube with said plastic bag to control the flow of said fluid; said valve means including a stem opening at one end into said plastic bag, a sleeve inside the other end of said stem through which the intake end of said tube is slidable, and a ball closing said intake end of said tube, there being a valve opening in the wall of said tube spaced from said ball, said opening being closed by said sleeve when said tube is withdrawn therethrough and opened to permit said liquid to flow from said stem into said tube when said tube is moved inwardly through said sleeve a distance sufficient to uncover said aperture; and spring means within said tube for clamping said tube in position on opposite sides of a wall of said housing to position the discharge end of said tube above said blade.

6. An insect and liquid fertilizer spray attachment for a lawn mower having a guiding handle and a cutting blade rotatable about a vertical axis underneath a housing having depending side walls comprising: a plastic bag adapted to be secured to said handle for containing a supply of liquid, a flexible plastic tube for interconnecting said plastic bag and the interior of said housing above said blade to discharge said liquid thereover, valve means at the junction of said tube with said plastic bag to control the flow of said fluid; said valve means including a stem opening at one end into said plastic bag, a sleeve inside the other end of said stem through which the intake ends of said tube is slidable, and a ball closing said intake end of said tube, there being a valve opening in the wall of said tube spaced from said ball, said opening being closed by said sleeve when said tube is withdrawn therethrough and opened to permit said liquid to flow from said stem into said tube when said tube is moved inwardly through said sleeve a distance sufficient to uncover said aperture; and a spring wire loop within said tube having the ends arranged and adapted to react against opposite sides of a side wall of said housing for clamping said tube thereto with portions thereof overlying said opposite sides to position the discharge end of said tube above said blade.

References Cited

UNITED STATES PATENTS

| 2,646,244 | 7/1953 | John | 251—353 |
| 3,090,187 | 5/1963 | Livingston | 56—295 |
| 3,214,893 | 11/1965 | Griffin | 56—25.4 |

FOREIGN PATENTS

| 625,488 | 7/1961 | Canada. |

ABRAHAM G. STONE, *Primary Examiner.*

ANTONIO F. GUIDA, *Assistant Examiner.*